United States Patent [19]

Su et al.

[11] Patent Number: 5,286,424
[45] Date of Patent: Feb. 15, 1994

[54] RECYCLING POLYOLEFINS COATED WITH CHLORINE-CONTAINING POLYMER

[75] Inventors: Tien-Kuei Su, Belle Mead, N.J.; Kenneth L. Lilly, Jr., Farmington, N.Y.

[73] Assignee: Mobil Oil Corporation, Fairfax, Va.

[21] Appl. No.: 973,858

[22] Filed: Nov. 9, 1992

[51] Int. Cl.$^5$ .......................................... B29B 17/00
[52] U.S. Cl. ........................... 264/23; 134/84; 264/37; 264/140; 264/349; 264/DIG. 69; 427/336; 427/444; 521/46; 425/205
[58] Field of Search ............... 264/23, 37, DIG. 69, 264/140; 521/79, 46; 427/336, 444; 425/217, 225, 308, 205

[56] References Cited

U.S. PATENT DOCUMENTS

| | | | |
|---|---|---|---|
| 3,819,773 | 6/1974 | Pears | 264/37 |
| 4,073,661 | 2/1978 | Buzga et al. | 264/37 |
| 4,098,996 | 7/1978 | Ryan et al. | 264/37 |
| 4,138,534 | 2/1979 | Tedesco | 521/79 |
| 4,368,274 | 1/1983 | Scott | 264/37 |
| 4,643,861 | 2/1987 | Hager | 264/118 |
| 4,826,897 | 5/1989 | Mehra et al. | 523/455 |
| 4,877,821 | 10/1989 | Hall et al. | 523/351 |
| 5,066,434 | 11/1991 | Liu et al. | 264/37 |

FOREIGN PATENT DOCUMENTS

| | | | |
|---|---|---|---|
| 53-141376 | 12/1978 | Japan | 264/37 |
| 55-166221 | 12/1980 | Japan | 264/37 |
| 2130124A | 5/1984 | United Kingdom | 264/37 |

OTHER PUBLICATIONS

Polymer Monographs, vol. 5; Polyvinylidene Chloride; Ritchie A. Wessling; Gordon and Breach Science Publishers: 1977; pp. 146-151.

*Primary Examiner*—Jeffery Thurlow
*Attorney, Agent, or Firm*—ALexander J. McKillop; Malcolm D. Keen; Marina V. Schneller

[57] ABSTRACT

Recycling polyolefin material, e.g. biaxially oriented polypropylene film, coated with a chlorine-containing polymer, such as polyvinylidene chloride homopolymer and/or copolymer, and having a primer therebetween. First, a caustic solution is formulated containing from about 0.1 wt. % to about 50 wt. % caustic, and from about 0.05 wt. % to about 1.0 wt. % of a wetting agent. The formulated caustic solution is heated to a temperature from about 25° C. to about 140° C. The polyolefin material is soaked in the heated caustic solution until the material is separable from the chlorine-containing polymer. After separating the polyolefin material from the chlorine-containing polymer, the material is reprocessed into desired product by extrusion, molding or other product forming process.

22 Claims, 1 Drawing Sheet

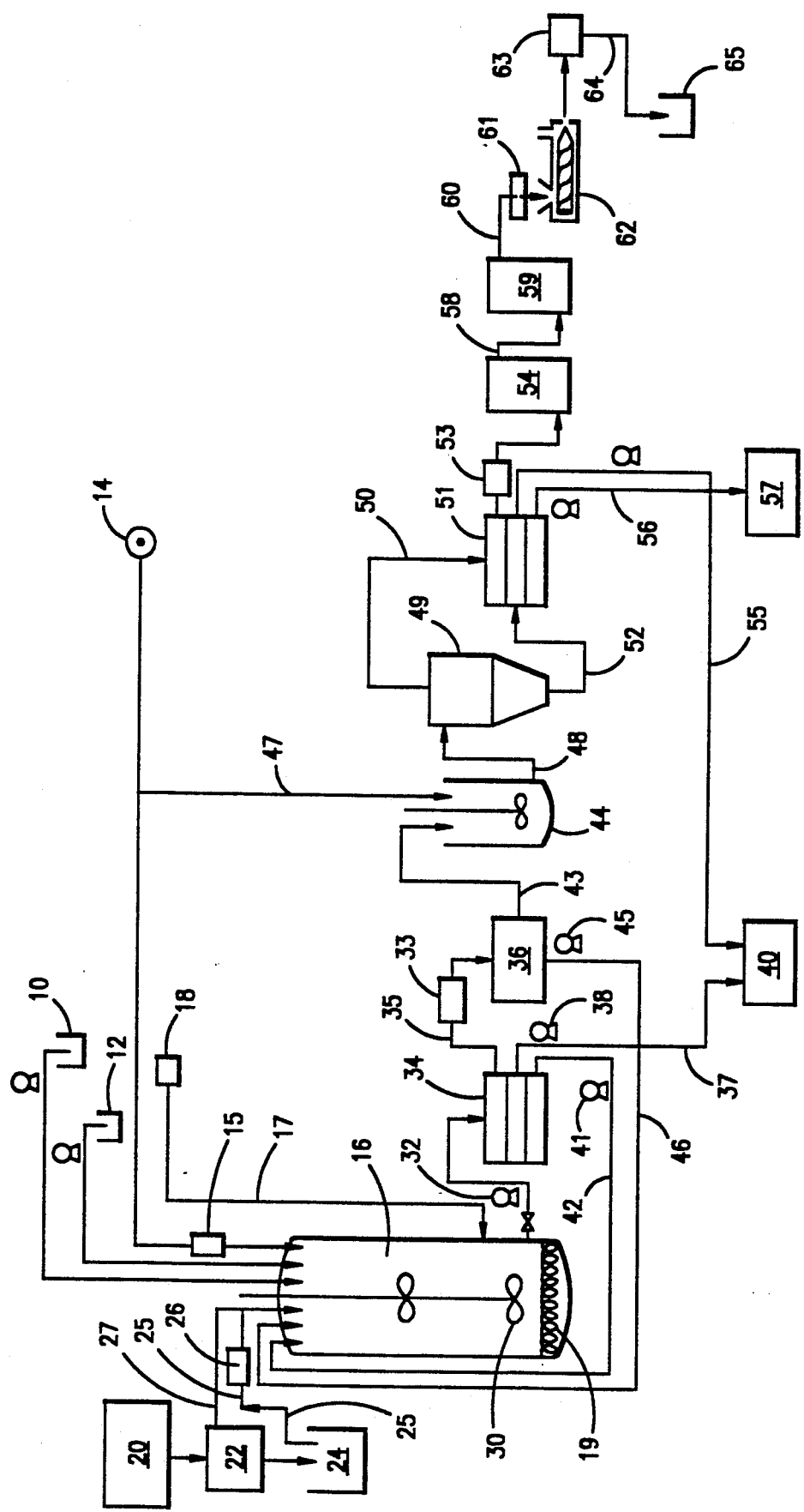

RECYCLING POLYOLEFINS COATED WITH CHLORINE-CONTAINING POLYMER

BACKGROUND OF THE INVENTION

1. Field of the Invention

The present invention relates to recycling polyolefins having a chlorine-containing polymer on at least one surface thereof. More specifically, the present invention relates to a method and a system of recycling polyolefins which includes removing a chlorine-containing polymer from the surfaces thereof prior to reprocessing the polyolefin.

2. Description of the Prior Art

Polyvinylidene chloride (PVdC) homopolymers and copolymers are chlorine-containing polymers that have excellent barrier properties to a wide variety of gases and liquids due to the combination of high density and high crystallinity in the polymers. Coated or extruded PVdC products with superior resistance to most gases, particularly oxygen, are used in packaging. The use of multipolymers of vinylidene chloride, as coatings or a coextruded layer for oriented polypropylene (OPP) materials has been recognized as an effective means for increasing the resistance of such film materials to the transmission of gases and vapors, such as oxygen and moisture vapor for example. Additionally, PVdC topcoating materials have been known to promote the heat sealability of such oriented film structures which, in an uncoated state, tend to seal only with great difficulty, if at all. PVdC coated oriented polypropylene is a particularly good packaging material for products which tend to be sensitive to attack by oxygen such as, for example, coffee and cheese, or snack foods such as corn-based products and potato chips.

Scrap is initially generated during the manufacture of the film, and secondarily when converters make the end product bag. Finally, scrap is available when the bagged product is consumed. With a commercially feasible recycle process, the film manufacturer would be able to blend the recycle into its main product lines. Even with ink and other coatings, the scrap of the converter and the consumer would be recyclable into many useful products such as carpet backing, park benches, office furniture, signs, battery cases, coat hangers, synthetic lumber and other construction material.

However, these PVdC materials are thermally unstable, with thermal degradation by evolving HCl due to dehydrochlorination starting at temperatures as low as 120° C. While extruding recycled polypropylene containing a PVdC on conventional equipment, thermal degradation can cause problems. For example, the evolving HCl is harmful to personnel and HCl can cause corrosive wear of the extrusion equipment. Further, discoloration, voids, and black specs are found in the product as a result of the PVdC which will downgrade the quality of the recycled product.

U.S. Pat. Nos. 4,643,861 and 4,877,821 disclose methods of preparing recyclable blends including thermally sensitive vinylidene chloride by adding a stabilizing or neutralizing agent to the blend before extrusion or molding. It appears that these patents seek to react and neutralize HCl after it is generated.

SUMMARY OF THE INVENTION

A broad aspect of the instant invention relates to removing a chlorine-containing polymer, and a primer if present, from the surfaces of homopolymers or copolymers of polyolefins such as polypropylene, polyethylene and polybutene, or blends thereof. The primer often is polyethyleneimine (PEI). However, epoxy, polyurethane and acrylic polymers are also useful as primers. Primer compositions are disclosed in U.S. Pat. Nos. 4,447,494 and 4,681,803, which patents are incorporated herein by reference.

The present invention contemplates recycling polyolefins having a coating chlorine content of at least about 5 wt. % of the total weight of the film and/or container scrap, but probably from about 5 wt. % to about 15 wt. % of the total scrap, and more probably from about 10 wt. % to about 12 wt. % of the total scrap. According to the present invention, the polyolefin is melt reprocessed only after removing the thermally unstable layer of the chlorine-containing polymer. The chlorine-containing polymer typically is polyvinyl chloride or polyvinylidene chloride, or blends thereof. The invention provides for reacting with the chlorine-containing polymer before HCl is generated, and eliminating the source of HCl prior to an extrusion or molding step.

In accordance with the instant invention, there is provided a method of recycling polyolefin material having a chlorine-containing coating, such as biaxially oriented polypropylene (OPP) film, coated with a polyvinylidene chloride homopolymer and/or copolymer (PVdC), and typically having a primer therebetween. First, a caustic solution is formulated comprising caustic in the range of from about 0.1 wt. % to about 50 wt. % and preferably 5 wt. % to about 20 wt. %, and a wetting agent in the range of from about 0.05 wt. % to about 1.0 wt. % and preferably 0.08 wt. % to about 0.2 wt. %. The formulated caustic solution is heated to within the range of from about 25° C. to about 140° C. and preferably from about 80° C. to about 120° C. The coated polyolefin material is soaked with or without mechanical force in the heated caustic solution until the polyolefin material is separable from the chlorine-containing coating.

The polyolefin material becomes separable because the caustic selectively reacts with the chlorine-containing coating to form a chloride salt and a dehydrochlorinated coating, and does not react with the underlying polyolefin material. Specifically, a sodium hydroxide solution formulated in accordance with this invention to recycle PVdC coated OPP would selectively react with the PVdC to form sodium chloride and dehydrochlorinated PVdC, thus freeing the OPP for recovery.

After separating the polyolefin material from the chlorine-containing polymer, the material is reprocessed into desired product by extrusion, molding or other heat generating product forming process. Such products include containers, films and those products noted hereinabove.

In accordance with a specific aspect, a mechanical force is generated to separate the polyolefin material from the chlorine-containing coating by a mechanism applying a stirring, water jet, ultrasonic, vibratory and/or friction force to the polyolefin material. Examples of friction force are scraping or wiping the chlorine-containing coating off the polyolefin material.

In accordance with another aspect of the invention, the polyolefin material having a chlorine-containing coating is transferred from the heated caustic solution to a water solution, and the water solution is agitated to apply mechanical force to separate the polyolefin material from the chlorine-containing coating, for example separating OPP from a PVdC coating. In this specific embodiment the vessel containing the caustic solution is freed for receipt of another batch of PVdC coated OPP, while a vastly less expensive water solution is being used to effect the final separation.

In accordance with another broad aspect of the present invention, there is provided a system for reprocessing polyolefin material coated with a chlorine-containing polymer. The system comprises a vessel for separating the chlorine-containing polymer from the polyolefin material, and means for supplying a caustic solution to the vessel having a formulation comprising from about 0.1 wt. % to about 50 wt. % of caustic and from about 0.05 wt. % to about 1.0 wt. % of a wetting agent. The system also includes means for heating the caustic solution to a temperature from about 25° C. to about 140° C., and means for supplying the coated polyolefin material to the vessel. In addition, means are provided for applying a mechanical force to the solution and the coated polyolefin material to accelerate (1) the separation of said polyolefin material from said chlorine-containing polymer and (2) the formation of a reaction product of the caustic solution and the chlorine-containing polymer.

The system further comprises means operatively connected to the vessel for separating the caustic solution, the reaction product and the polyolefin material into respective streams. Also provided are means for recycling the caustic solution stream to the vessel, and means for transporting the reaction product stream to a solids waste holding tank. In addition, there are means for rinsing and drying the polyolefin stream, and means for pelletizing the dried polyolefin.

The solvent of the caustic solution of the present invention may be either aqueous, or organic e.g. methanol and/or DMSO. Further, the caustic is preferably potassium hydroxide, calcium hydroxide or sodium hydroxide. Still further, the wetting agent is preferably sodium lauryl sulfate. Other suitable wetting agents are ethoxylated nonyl phenol and sodium dioctyl sulfosuccinate.

Thus, the method of the present invention of reprocessing polyolefin after removing the chlorine-containing coating can produce a better quality product, provide a safer working environment, and prevent corrosive wear of equipment.

As used herein, "coating" or "coated" is intended to include all forms of layering including standard coating techniques such as graveur, roll coating and the like, as well as coextrusion and other processes of forming laminated product such as film.

BRIEF DESCRIPTION OF THE DRAWING

The FIGURE is a flow diagram of an embodiment of the present invention showing a system for removing PVdC from scrap polyolefin film.

DESCRIPTION OF SPECIFIC EMBODIMENTS

With reference to the FIGURE, there is shown a flow diagram of a PVdC removal system wherein caustic from a tank 10, a wetting agent from another tank 12 and water from a source 14 and through a heat exchanger 15 are fed to a vessel or reactor 16 to formulate a caustic solution therein. The vessel 16 typically is closed because it is operated at an elevated temperature with consequential elevated pressure.

Heat is applied to the vessel 16 by a line 17 from a steam heat source 18. Heat may also be applied by an element 19 at the bottom of the vessel 16. In this example, scrap OPP film with a PVdC coating and a primer of polyethyleneimine is removed from a bin 20 and fed to a granulator or grinder 22 where the scrap is ground into fluff which may be in the order of about ⅛ in. to about ¼ in. particles. The fluff is fed to a storage or feed hopper 24 from which the fluff is removed upon demand by an air blower or vacuum loader 26. The air blower 26 feeds the fluff by a line 25 to the vessel 16. Alternatively, the fluff may be fed directly from the granulator 22 by a line 27 directly to the vessel 16.

The caustic solution in the vessel 16 comprises from about 0.1 wt. % to about 50 wt. % of caustic, and from about 0.05 wt. % to about 1.0 wt % of a wetting agent. Preferably, the solution is from about 5 wt. % to about 20 wt. % caustic, and from about 0.08 wt. % to about 0.2 wt. % of a wetting agent.

The caustic preferably is potassium hydroxide, calcium hydroxide or sodium hydroxide, and the wetting agent preferably is sodium lauryl sulfate. Other suitable wetting agents are ethoxylated nonyl phenol and sodium dioctyl sulfosuccinate. Further, the solvent in the caustic solution may be organic or, as in this case, aqueous. A suitable organic solvent is methanol and/or DMSO.

The caustic solution in the vessel 16 is heated by the steam from the heat source 18 to from about 25° C. to about 140486 ° C., and preferably from about 80° C. to about 120° C. The caustic solution is agitated by a pair of shaft driven impellers 30 for a period of time sufficient to separate the PVdC and primer from the OPP fluff. When the PVdC and primer have been separated from the fluff in the vessel 16, a pump 32 empties the contents of the vessel 16 into a filter screen apparatus 34 which provides vibratory motion. The top output of the filter screen vibrator 34 is a stream of fluff stripped of PVdC and primer which exits by a line 35 and is fed by a screw or conveyer belt 33 to a centrifuge 36. Exiting the filter screen vibrator 34 by a line 37 and a pump 38 is a reaction product stream of dehydrochlorinated PVdC sludge which is sent to a solids waste holding tank 40 for treatment and disposal. Also exiting the filter screen vibrator 34 at the bottom portion thereof through a pump 41 and a line 42 is a caustic solution stream which is recycled to the vessel 16.

The output of the centrifuge 36 is further stripped OPP fluff which exits by a line 43 leading to a rinsing vat 44. The other output from the centrifuge is additional recycle caustic which is fed by pump 45 and line 46 to the vessel 16.

Water from the water source 14 and a line 47 is added to the vat 44 where the fluff is rinsed, and exits in batch via a line 48 to a cyclone separator 49. The cyclone separator 49 propels rinsed fluff by a line 50 to the top of a second filter screen vibrator 51. The bottoms of the cyclone separator 49 essentially will be dehydrochlorinated PVdC sludge that remained on the fluff. The bottoms from the cyclone 49 is fed by a line 52 to the middle level of the filter screen vibrator 51.

One output of the filter screen vibrator 51 is rinsed fluff that is fed through a screw or belt conveyer 53 to a centrifuge drier 54. Solid waste from the filter screen vibrator 51 is fed by a line 55 to the solids waste holding tank 40 for further processing and disposal. The final output of the filter screen vibrator 51 is solution waste fed by a line 56 to a solution waste container 57 for further treatment and disposal.

The fluff in the centrifuge drier 54 is spun dry and fed by a line 58 to a hot air drier 59. The hot air drier 59 further drys the fluff from the centrifuge drier 54 and feeds the fluff via line a 60 to a forced feeder 61. The forced feeder 61 feeds the fluff to an extruder 62 which forms an extruded product. The extruded product is passed to a pelletizer 63 to form pellets which are sent by a line 64 to a pellet collector 65. These pellets are reprocessed into desired product by extrusion, molding or other product forming process.

It is also contemplated that, if desired, the granulator or grinder 22 would reduce film to particle sizes larger than fluff, for example 1.0 in² to 3 in².

Further, the invention also contemplates removing a chlorine-containing coating from a roll of polyolefin film. For example, the roll may be placed in a caustic solution of the invention, and shaken and/or scraped to remove the coating; or the roll may be unwound from one roller through the caustic solution and taken up on another roller.

As noted above, in another embodiment of the invention, the polyolefin material having a chlorine-containing coating is transferred from the heated caustic solution to a water solution, and the water solution is agitated to apply mechanical force to separate the polyolefin material from the chlorine-containing coating, for example separating OPP from a PVdC coating. One system for transferring the solids to a water solution is to provide a screen liner in the vessel 16, which liner is lifted out of the vessel 16 with the solids and used to transport the solids to the water solution such as the vat 44. Thus, the vessel 16 containing the caustic solution is freed for receipt of another batch of PVdC coated OPP, while a vastly less expensive water solution is being used to effect the final separation.

EXAMPLES

In a first set of examples, organic solvents were used. In one example the caustic was 30 wt. % of potassium hydroxide in a methanol solvent. Coextruded film of about 0.7 mil thickness and having OPP and PVdC layers (PXS) were cut into approximately 3 in.×3 in. particles, and soaked in the caustic solution for 4 hours at room temperature. The PVdC layer was wiped off, as confirmed by an Energy Dispersion Spectrum (EDS) test.

A high barrier PVdC coated OPP (HBS) of about 0.7 mil thickness film was similarly cut into approximately 3 in.×3 in. pieces and soaked in a caustic of 30 wt. % of potassium hydroxide in a methanol solvent for 4 hours with the same result as the preceding example, as confirmed by EDS testing.

A coextruded film of about 0.7 mil thickness and having OPP and PVdC layers (PXS) was also cut into approximately 3 in.×3 in. pieces and soaked for 10 minutes in a solution of 90 wt. % DMSO and 10 wt. % of 30 wt. % potassium hydroxide in methanol. Most of the coating separated, and the remainder could be wiped off as confirmed by EDS testing.

The results of the foregoing examples of removing PVdC coating from OPP by exposing the film to potassium hydroxide in organic solvents are shown in the following Table I.

TABLE I

| PVdC COATING REMOVAL IN ORGANIC SOLUTIONS | | | |
|---|---|---|---|
| Specimen | Solution | Conditions* | Effects |
| PXS or HBS | 30% KOH in MeOH | 4 Hrs. | Coating could be wiped off. EDS confirms the removal. |
| PXS | 90 % DMSO & 10% of 30% KOH in MeOH | 10 Min. | Most of the coating separated. The remaining could be wiped off. |

*At room temperature
PXS = Coextruded PVdC Coating
HBS = High Barrier PVdC Coating Energy Dispersion Spectrum (EDS) analyses for both coextruded PVdC coating (PXS) and high barrier PVdC coating (HBS) are reported in the following Table II, and clearly show that the PVdC coating had been removed.

TABLE II

| ENERGY DISPERSION SPECTRUM (EDS) ANALYSIS OF THE CHLORINE CONTENT OF THE FILMS TREATED WITH 30% KOH IN METHANOL | |
|---|---|
| Sample I.D. | Cl/C* |
| PP Side - PXS | 1.2 |
| PVdC Side - PXS | 15.7 |
| PP Side - HBS | 0.5 |
| PVdC Side - HBS | 26.2 |
| PP Side - Treated & Wiped PXS | 0.2 |
| PVdC Side - Treated & Wiped PXS | 0.2 |
| PP Side - Treated PXS | 0.2 |
| PVdC Side - Treated PXS | 1.1 |
| PP Side - Treated & Wiped HBS | 0.2 |
| PVdC Side - Treated & Wiped HBS | 0.2 |
| PP Side - Treated HBS | 0.2 |
| PVdC Side - Treated HBS | 3.8 |

PXS = Coextruded PVdC Coating
HBS = High Barrier PVdC Coating
Cl/C = Chlorine to Carbon Ratio
*NB First 0.5 Cl/C = instrument or background noise While treating a PXS film in an aqueous solution, such as water, or 1 wt. % Tide detergent in water, or 1 wt. % of a wetting agent like sodium lauryl sulfate in water at 80° C. to 100° C. for 24 hours, it was observed that some of the PVdC coating was removed. Under the same treatment conditions for an HBS film, however, no PVdC coating was removed.

However, in another example of using aqueous solutions, 4 grams of PXS film were treated in 0.8 grams of calcium hydroxide in 400 cc. of water, at 80° C. for 4 hours. After the treatment, most of the PVdC coating was removed as confirmed by an EDS analysis.

Other examples of removing a PVdC coating and a PEI primer by using an aqueous solution of KOH and a wetting agent are illustrated in Table III. In these examples, 20 grams of either PXS or HBS film were treated in 2 wt. % to 30 wt. % of KOH and 0.5 wt. % of sodium lauryl sulfate in 2000 cc. of water, under mechanical agitation over the specified duration time. Both IR (infrared) and EDS analyses confirmed that the PVdC coating had been removed completely. In addition, a test using the Eosine dye solution indicated that the PEI primer was completely removed as well. Normally, PVdC coated OPP films turn dark brown or black when they melt at 250° C. In contrast, after removing the PVdC and the PEI, the resultant polypropylene did not show any discoloration when it melted at 250° C.

Still more examples of removing PVdC layers from laminated films by using aqueous solutions are illustrated in Table III. In one example, 16 grams of OPP-/PU/PXS film were treated in 800 cc. water containing 2 wt. % KOH and 0.5 wt. % of sodium lauryl sulfate at 80° C. for 17 hours. IR analysis confirmed that the PVdC coating had been removed entirely. Then 16 grams of OPP/PE/HBS fluff was treated using a solution of 5 wt. % of KOH and 1 wt. % of sodium lauryl sulfate in 800 cc. of water at 80° C. for 30 hours. The fluff separated and the PVdC coating was removed completely. Again, the resultant polypropylene showed no discoloration after melting at 250° C. Accordingly, the resultant polypropylene can be reprocessed without degradation problems.

TABLE III

PVdC COATING REMOVAL IN AQUEOUS SOLUTIONS (KOH IN WATER)

| Speciman | Form | Conc. wt. % | Effects | Evidence |
|---|---|---|---|---|
| PXS | Film | 2–30 | Coating removed | Gauge reduction (0.7 to 0.6 mil) IR analysis EDS analysis |
| HBS | Film | 2–30 | Coating removed | Gauge reduction (0.7 to 0.6 mil) IR analysis EDS analysis |
| OPP/PU*/PXS (*Polyurethane adhesive) | Film | 2 | Coating removed | Gauge reduction (1.8 to 1.7 mil) IR analysis |
| OPP/PE*/HBS (*Hot polyethylene adhesive) | Fluff | 5 | Coating removed Films delaminated | Gauge reduction |

The following examples show a significant improvement in removal time efficiency by using a caustic solution of sodium hydroxide. By treating the PXS film in water containing 5 wt. % of NaOH and 0.5 wt. % of sodium lauryl sulfate at 80° C., the PVdC coating was removed totally within 6 hours. By increasing the temperature to about 98° C. the time required to remove the coating completely was shortened further to about 4 hours.

To optimize removal efficiency, a variety of parameters were investigated including temperature, specimen size, mechanical action, caustic concentration, and wetting agent. HBS film was selected for these experiments because it is more difficult to remove the PVdC coating from an HBS film than a PXS film.

As noted above, the present invention contemplates recycling polyolefins having a coating chlorine content of at least about 5 wt. % of the total weight of the film and/or container scrap, but probably from about 5 wt. % to about 15 wt. % of the total scrap, and more probably from about 10 wt. % to about 12 wt. % of the total scrap. In the following examples the chlorine content is 11.6 wt. % of the total weight of the film being tested. About 15 grams of an HBS film and 2000 cc. of a NaOH solution were placed into a 3000 cc. flask equipped with a mechanical stirrer having a ⅜ in. shaft with three 1.0 in. blades. The parameters for a reference run which completely removed the PVdC coating from HBS were defined as:

| Temperature | 98° C. |
|---|---|
| wt. % Solids | 0.75 |
| wt. % NaOH | 5 |
| wt. % WetAgent | 0.5 |
| Sample Size | 2" × 2" |
| Mixing Speed | 1500 rpm |
| Time hrs. | 6 |

These reference run parameters were varied and the results are summarized as follows:

Effect of Temperature

When the temperature was decreased to 80° C. and 60° C. it took 10 and 20 hours, respectively, to completely remove the coating. Thus, temperature has a significantly positive effect on the PVdC coating removal.

Effect of Base Concentration

When the NaOH concentration was lowered to 2% and 1%, it took 10 and 22 hours, respectively, to remove the coating. Further, when the NaOH concentration was increased to 10%, it took only 4 hours to remove the coating. Thus, the effect of the NaOH concentration on removing the PVdC coating is also positive.

Effect of Specimen Size

In general, 1"×1", 2"×2", and 3"×3" specimen sizes were used, the time required to remove the coating completely was similar, about 6 hours. However, the specimen with a size of 3"×3" or bigger tended to wrap around the stirrer shaft.

Effect of Wetting Agent

Without a wetting agent, the PVdC coating is removable at a much slower rate, and it was not completely removed even after 24 hours of treatment. Therefore, a wetting agent, such as sodium lauryl sulfate used herein, does facilitate the PVdC coating removal. However, the use of sodium lauryl sulfate at a 0.5% level can create a foaming problem if the agitation is too vigorous.

TABLE IV

| Temp. | | Removal Efficiency | | | |
|---|---|---|---|---|---|
| Temp, °C. | Time, hrs. | Base (NaOH) Conc. Wt., % | Time, hrs. | WetAgent Conc. Wt., % | Time, hrs. |
| 60 | 20 | 1 | 22 | 0.0 | >24 |
| 80 | 10 | 2 | 10 | 0.1 | 6 |
| 98 | 6 | 5 | 6 | 0.2 | 6 |
| | | 10 | 4 | 0.5 | 6 |

Although the examples are directed to polypropylene with specific emphasis on oriented polypropylene (OPP), the present invention, as noted above, is applicable in its broad scope to removing PVdC, and a primer, if present, from homopolymers or copolymers of polyolefins such as polypropylene, polyethylene and polybutene, or blends thereof.

Thus, while the invention has been described in conjunction with specific embodiments thereof, it is evident that many alternatives, modifications, and variations will be apparent to those skilled in the art in light of the foregoing description. According, it is intended to embrace all such alternatives, modification, and variations as fall within the spirit and broad scope of the appended claims.

What is claimed is:

1. A method of reprocessing polyolefin material coated with a chlorine-containing polymer comprising the steps of:
formulating a caustic solution comprising from about 0.1 wt. % to about 50 wt. % of caustic, and from about 0.05 wt. % to about 1.0 wt. % of a wetting agent;
heating said caustic solution to a temperature from about 25° C. to about 140° C.;
soaking the coated polyolefin material in the heated caustic solution until said polyolefin material is separable from said chlorine-containing polymer coating, said polyolefin material becoming separable by the caustic selectively reacting with said chlorine-containing polymer to form a chloride salt and a dehydrochlorinated polymer;
separating said polyolefin material from said dehydrochlorinated polymer and said caustic solution; and
subjecting the separated polyolefin material to a heat generating product forming process.

2. The method of claim 1 wherein:
said polyolefin is selected from the group consisting of polypropylene, polyethylene, polybutene and blends thereof;
said chlorine-containing polymer is selected from the group consisting of polymers and copolymers of vinyl chloride, vinylidene chloride, and blends thereof;
said caustic is selected from the group consisting of potassium hydroxide, calcium hydroxide and sodium hydroxide;
said caustic solution comprises from about 5 wt. % to about 20 wt. % of said caustic, and from about 0.08 wt. % to about 0.2 wt. % of said wetting agent; and
said caustic solution is heated to a temperature from about 80° C. to about 120° C.

3. The method of claim 2 wherein said chlorine-containing polymer is polyvinylidene chloride homopolymer and/or copolymer (PVdC), and wherein a primer is between said polyolefin material and said PVdC coating, and further comprising applying a mechanical force to the heated caustic solution to accelerate separation of said polyolefin material from said PVdC.

4. A method of reprocessing polypropylene material coated with a polyvinylidene chloride homopolymer and/or copolymer (PVdC) comprising the steps of:
(a) formulating a caustic solution comprising from about 0.1 wt. % to about 50 wt. % of caustic, and from about 0.05 wt % to about 1.0 wt. % of a wetting agent;
(b) heating said caustic solution to a temperature from about 25° C. to about 140° C.; and
(c) soaking the PVdC coated polypropylene material in the heated caustic solution until said polypropylene material is separable from said PVdC.

5. The method of claim 4 wherein said polypropylene material is biaxially oriented polypropylene (OPP) film, and wherein a primer is between said OPP and said PVdC.

6. The method of claim 5 further comprising applying a mechanical force to the heated caustic solution to accelerate separation of said OPP film from said PVdC and said primer.

7. The method of claim 6 wherein the mechanical force is generated by a mechanism applying stirring, water jet, ultrasonic, vibratory and/or friction force.

8. The method of claim 7 wherein said friction force is applied by scraping or wiping said PVdC off said OPP film.

9. The method of claim 5 further comprising the steps of:
(d) transferring the PVdC coated OPP film from said heated caustic solution in step (c) to a water solution; and
(e) applying a mechanical force to the heated caustic solution to accelerate separation of said OPP film from said PVdC and said primer.

10. The method of claim 5 wherein said caustic solution comprises from about 5 wt. % to about 20 wt. % of said caustic.

11. The method of claim 5 wherein said caustic solution comprises from about 0.08 wt. % to about 0.2 wt. % of said wetting agent.

12. The method of claim 5 wherein said caustic solution is heated to a temperature from about 80° C. to about 120° C.

13. The method of claim 5 wherein said caustic is selected from the group consisting of potassium hydroxide, calcium hydroxide and sodium hydroxide.

14. The method of claim 5 wherein said wetting agent is sodium lauryl sulfate.

15. The method of claim 5 wherein the solvent in said caustic solution is organic or aqueous.

16. The method of claim 15 wherein the organic solvent is methanol and/or DMSO.

17. The method of claim 5 wherein said primer is polyethyleneimine.

18. The method of claim 5 wherein said PVdC coated OPP film is in a particle size from about ⅛ inch to about 6 inches.

19. The method of claim 5 wherein said PVdC coated OPP film is in a particle size from about ⅛ inch to about ¼ inch fluff.

20. The method of claim 4 further comprising:
separating said polypropylene material from said PVdC and said caustic solution; and
subjecting the separated polypropylene material to a heat generating product forming process.

21. A system for reprocessing polyolefin material coated with a chlorine-containing polymer comprising:
a vessel for separating said chlorine-containing polymer from said polyolefin material;
means for supplying a caustic solution to said vessel having a formulation comprising from about 0.1 wt. % to about 50 wt. % of caustic, and from about 0.05 wt. % to about 1.0 wt. % of a wetting agent;
means for heating said caustic solution to a temperature of from about 25° C. to about 140° C.;
means for supplying said coated polyolefin material to said vessel; and
means for applying a mechanical force to said solution and said coated polyolefin material to accelerate (1) separation of said polyolefin material from said chlorine-containing polymer and (2) formation of a reaction product of said caustic solution and said chlorine-containing polymer.

22. The system of claim 21 further comprising:
means operatively connected to said vessel for separating said caustic solution, said reaction product and said polyolefin material into respective streams;

means for recycling the caustic solution stream to said vessel;

a solids waste holding tank;

means for transporting the reaction product stream to said solids waste holding tank;

means for rinsing and drying the polyolefin stream; and means for pelletizing the dried polyolefin.

* * * * *